(12) United States Patent
Allen et al.

(10) Patent No.: US 6,281,926 B1
(45) Date of Patent: *Aug. 28, 2001

(54) IMAGE ANSWERING MACHINE

(75) Inventors: James D. Allen, Rochester; Allen D. Heberling, Penfield; Omid A. Moghadam, Pittsford; John R. Squilla, Rochester, all of NY (US)

(73) Assignee: Eastman Kodak Company, Rochester, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/203,069

(22) Filed: Dec. 1, 1998

(51) Int. Cl.[7] .................................................. H04M 7/14
(52) U.S. Cl. ............................... 348/14.06; 348/14.01; 348/14.05
(58) Field of Search ................................. 348/14, 15, 16; 379/93.17, 93.21, 88.13; 370/389, 522

(56) References Cited

U.S. PATENT DOCUMENTS

| 4,484,344 | * | 11/1984 | Mai et al. .............................. 381/46 |
| 5,453,982 | * | 9/1995 | Pennington et al. ................ 370/85.1 |
| 5,521,716 | * | 5/1996 | Itoh ..................................... 358/402 |

FOREIGN PATENT DOCUMENTS

| 0617562A2 | * | 9/1994 | (EP) | ............................... H04N/7/15 |
| 401233944A | * | 9/1989 | (JP) | ............................... H04M/1/65 |
| 407023357A | * | 1/1995 | (JP) | ............................... H04N/7/14 |
| 410126492A | * | 5/1998 | (JP) | ............................... H04N/7/14 |

* cited by examiner

Primary Examiner—Curtis Kuntz
Assistant Examiner—Melur Ramakrishnaiah
(74) Attorney, Agent, or Firm—William F. Noval

(57) ABSTRACT

Image answering apparatus comprising: an interface for connecting to a public telephone system; and memory for storing audio and image information received over the public telephone system.

3 Claims, 5 Drawing Sheets

IMAGE ANSWERING MACHINE

FIELD OF THE INVENTION

This invention relates in general to an image storage system, and relates more particularly to an image answering machine for storing voice and images received over a public telephone system.

BACKGROUND OF THE INVENTION

Digital cameras have come into wide use for acquiring images of people, scenery, sporting events, etc. The acquired digital images are either stored on removable media (memory card, magnetic disk) which can be used later with a computer or transmitted from the camera directly to a computer. In the case where the user is located near a computer, the images can be transmitted over a dedicated communication link, such as a cable or wireless link. When, however, the user is travelling and is therefore remote from his computer, the digital images can be transmitted form the digital camera to the users computer over the public telephone system. However, digital images from a digital camera or other source cannot be accepted by an individual who does not own a personal computer or who does not want the computer to be left on to receive incoming calls (for example, during a prolonged travel).

There is thus a need for a device that is low in cost that can store images transmitted over public telephone systems.

SUMMARY OF THE INVENTION

According to the present invention, there is provided a solution to the problems of the prior art.

According to a feature of the present invention, there is provided an image answering apparatus comprising: an interface for connecting to a public telephone system; and memory for storing audio and image information received over the public telephone system.

ADVANTAGEOUS EFFECT OF THE INVENTION

The invention has the following advantages.

1. A low cost machine is provided for storing both images and voice transmitted over a public telephone system.

2. A user of a digital camera or other source of digital images can store images sent over a public telephone without owning an expensive personal computer or without having to leave a personal computer on for extended periods while away from home or business.

DETAILED DESCRIPTION OF THE INVENTION

In general, the present invention provides a digital or analog answering machine that can accept calls from digital cameras or image sharing devices and can play them back to printers, picture phones or computers. The Image Answering Machine is equipped with the following additional features and processes to make it image compatible:

Extra long message tape or memory because images take a lot of memory.

Communication protocol that detects an "image data" call and determines available tape before receiving the image.

Ability to send the data back out a data port like RS232 or USB.

The ability to send the data out of a phone simulator port so it could be compatible with a computer modem.

The ability to read an image header and announce the image title in addition to the image data and time (which is an answering machine function, not the image data).

The ability (optional) to decode the presence of voice data on the image file (like TIFF) and play that message on command.

The ability to play it back into a camera for review either locally or via a call to the device.

The ability to decode and display on the answering machine.

Figure 1:
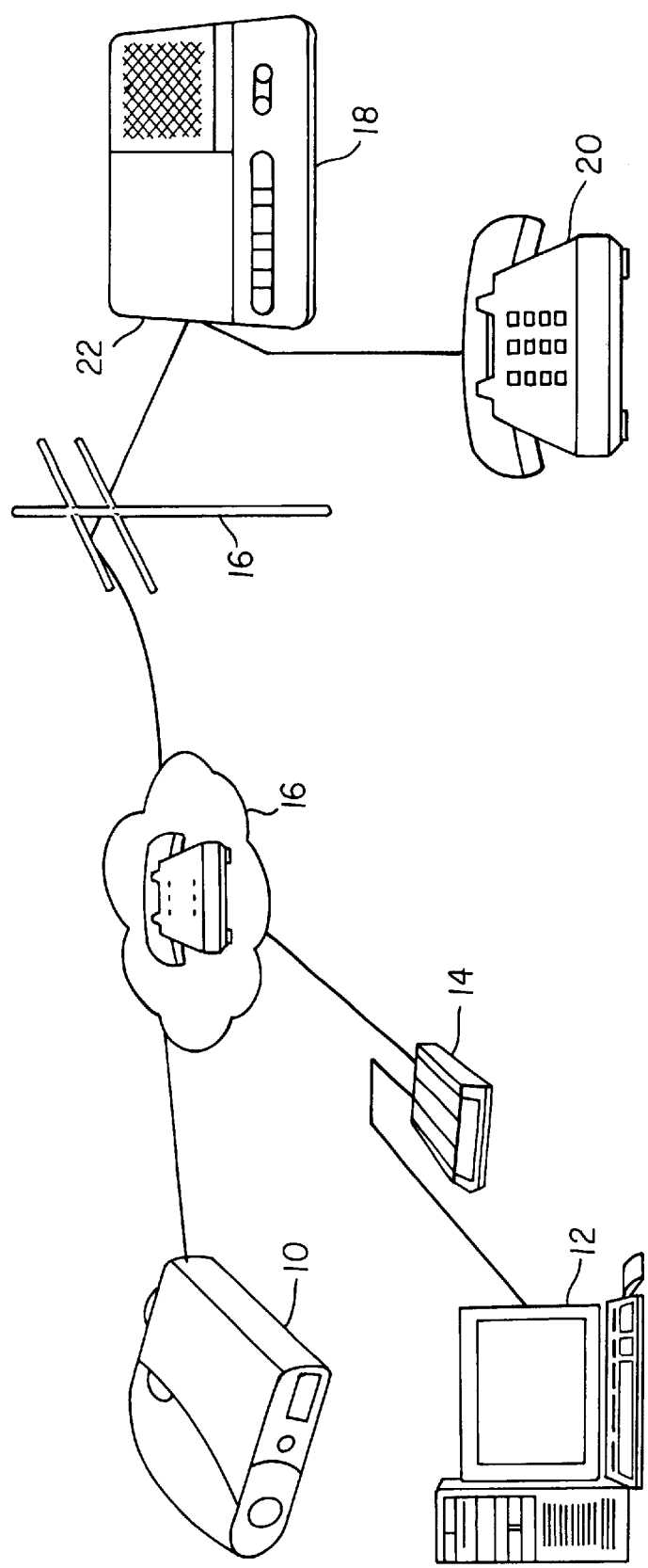
FIG. 1 is a diagrammatic view of a system incorporating the present invention.

Referring now to FIG. 1, there is shown a system incorporating the present invention. As shown, an imaging device 10, such as a digital camera or scanner or other source of digital images, transmits images over a public telephone system 16 (such as the Public Switching Telephone Network, cellular phone network, etc.) to an image answering machine 18 (according to the present invention) having interface 22 (phone jack). The images can also be transmitted over system 16 to personal computer 12 via modem 14. A telephone 20 can also be connected to machine 18 through interface 22.

Figure 2:
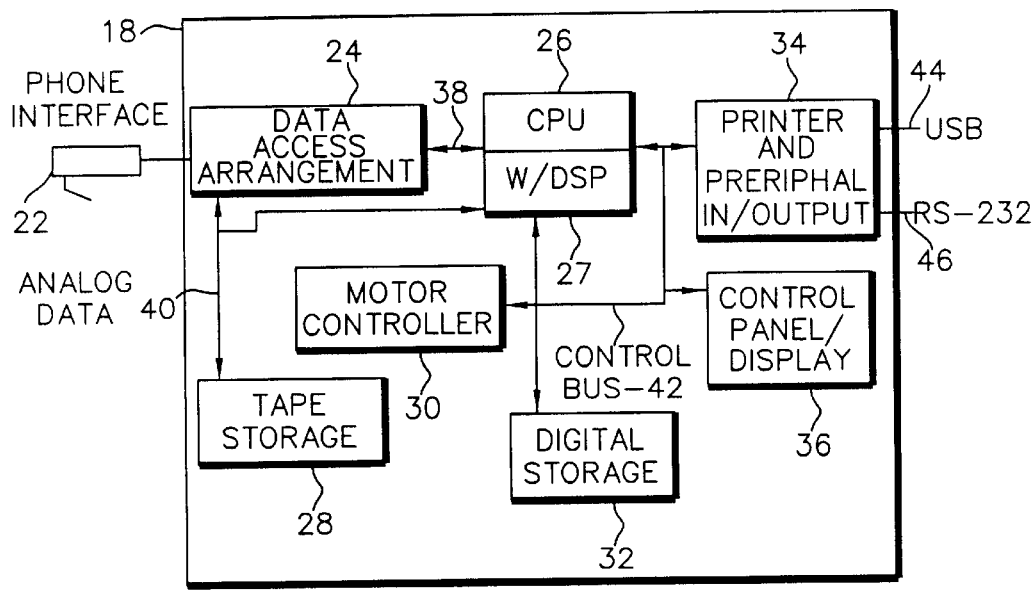
FIG. 2 is a block diagram of an embodiment of the present invention.

FIG. 2 shows in greater detail an embodiment of the image answering machine 18 of the present invention. As shown, machine 18 includes a phone interface 22 for connection to a public telephone system and/or to a telephone, a data access arrangement 24, a central processing unit 26, and analog and/or digital storage, such as tape storage 28 for analog data and digital storage 32 for digital data. A motor controller 30 controls tape storage 28. Central processing unit (CPU) 26 includes DSP (Digital Signal Processor) 27. Machine 18 also includes analog data bus 40, printer and peripheral I/O 34, control panel/display 36, and control bus 42. I/O 34 is shown as having USB (Universal Serial Bus) interface 44 and RS-232 interface 46. This is the preferred embodiment, but many other communication interfaces are feasible, including firewire, IEEE 1394, and others.

Figure 4A:
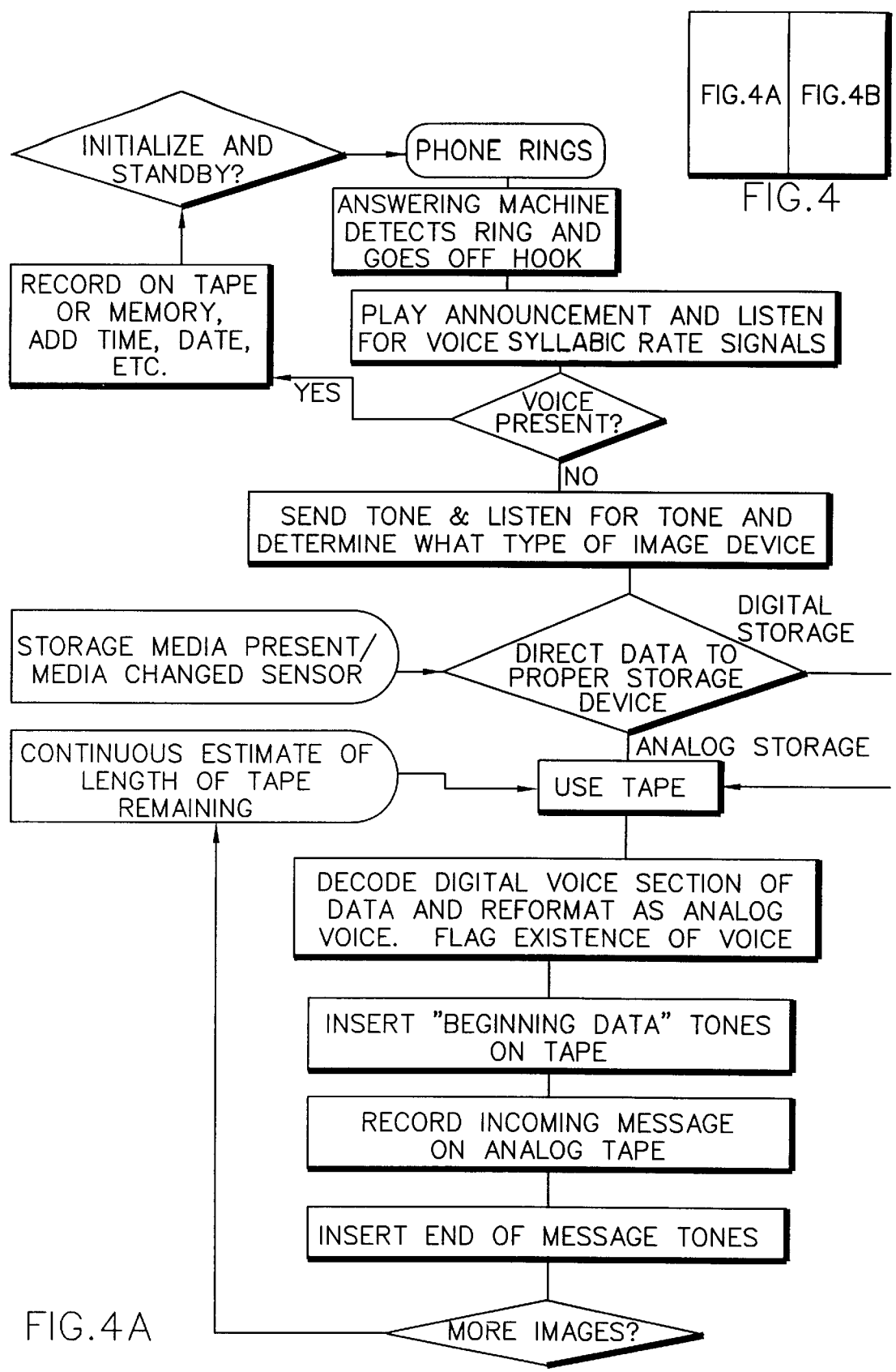
FIGS. 4A, 4B are a flow diagram of the record function of the present invention.
Figure 4B:
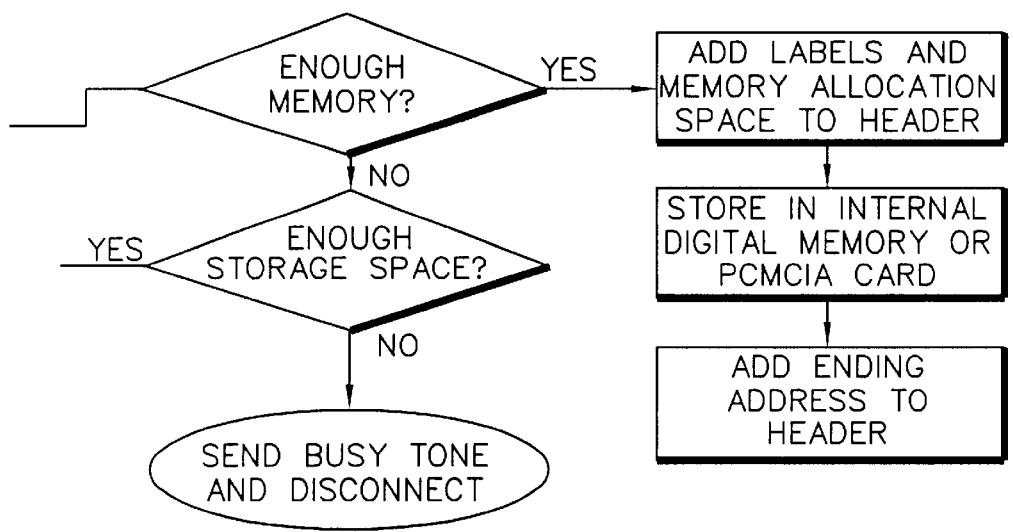

Referring now to FIGS. 1, 2, and 4, there will be described operation of the present invention in the record function. As shown, image device 10, such as a digital camera, makes a call to the answering machine 18 via the public phone network 16. It initiates this call in the normal means by presenting an off hook condition to the phone line, and upon receiving dial tone, transmits DTMF (Dual Tone Multi-Frequency) tones to dial the desired number. The call is routed by the PSTN 16 to the image answering machine 18 via connection to phone jack 22 in the standard way. When the call is received by the image answering machine 18, the line rings for a presentable number of rings, at which point the image answering machine 18, presents an off hook condition to the PSTN 16 which completes the connection. The machine 18 plays a prerecorded message and prepares to record a voice message. The DSP part 27 of the CPU 26 samples the incoming data on line 40 and checks for 8 to 16 Hz modulation, characteristic of human speech. If no speech is detected the image answering machine 18 emits a unique audio tone so that the transmitting device 10 knows the image answering machine 18 is on the line. The transmitting device 10 then returns a unique tone indicating that an image device 10 in is on the line. The imaging answering machine 18 ceases its initial tone and prepares to receive digital (image) data.

Figure 3:
FIG. 3 is a diagrammatic view of an exemplary file header.

In the receive image data mode, the machine 18 records the audible frequency shift or AM modulated signal. In the answering machine 18, this data is either stored on analog tape 28 in its original form, or sampled by the DSP 27 and converted to a digital format for storage in the digital memory 32. In the digital storage mode, the image answering machine 18 can look at the digital data and determine from the file header FIG. 3, how much data is required to store the transmission. The image answering machine 18 must keep track of tape time to make sure it can record an entire image. If there is insufficient memory to store an image, a tone is returned to the calling imaging device and the device can try again with a different size image. This negotiation can happen several times before the answering machine or camera gives up. Using a tone method, makes the transmitting device decide if it wants to try again without engaging in a more complex digital protocol. If the analog method is used, the system may not know what size image(s) is(are) coming.

It is possible to digitize the voice data and store it with image data in the digital storage section 32. Digital answering machines 18 do exactly that with voice (only) today. In this case, the voice and image files have to be identified by file type in the file header FIG. 3. In digital cameras 10 (FIG. 1) with voice recording capability, it is possible to store a voice clip as a digital part of the image file. EXIFF or TIFF is a common file format for storing this type of data as tagged data. The image answering machine 18 can have the ability to decode the voice tag and use the DSP 7 to regenerate the voice message. That message can then be added to the answering machine 18 before the image so the photographer can instruct the receiver, label the data with a voice label, or record a voice command used by a device which could be connected to the image answering machine by its peripheral port 34 (FIG. 2).

If the data is stored in analog form, it can be marked as digital or voice by placing different tones at the beginning and end of each segment, or by detecting the syllabic rate of the voice segments.

If a voice call was made, the lack of tones and detection of syllabic rate (the sub 20 Hz modulation of human speech) voice energy, the machine 18 acts as a normal voice answering machine.

Once the image(s) data is(are) captured in the machine 18 as analog tones, the system can send back a verification or status signal that can be used to notify the user via the Control Panel/Display 36. The connection can be dropped by presenting a high impedance "on hook" condition to the phone line. The camera preferences can be preset to erase any successfully transmitted image.

Figure 5:
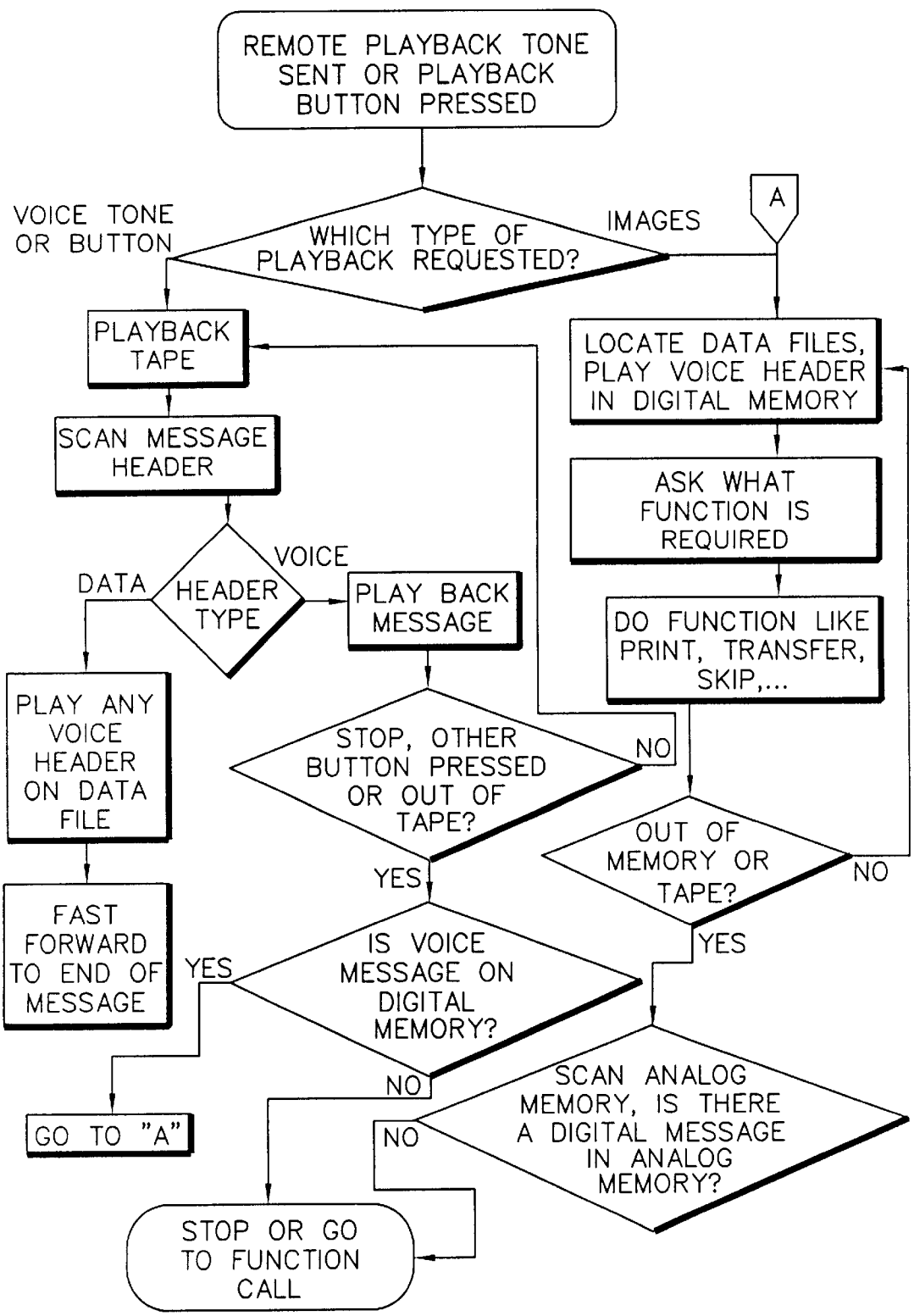
FIG. 5 is a flow diagram of the playback function of the present invention.

The next part of this scenario is playing the data/message back in a usable manner (see FIGS. 1, 2, 5). The image answering machine 18 needs to be able to tell the difference between image and voice data when they are recorded on the same media. If the data were recorded in analog storage 28, the CPU 26 would first look to the Control Panel/Display 36 to determine if the user wanted to play back voice messages or images. The tape of storage 28 would rewind and either look for tones preceding the segments and play the desired types, and fast forward the other types of segments, or perform a syllabic rate detection on the segments and then decide whether to play the sound or fast forward. A Fourier Transform may be required to preserve the frequency content of the tape segments so that the syllabic rate can be detected in the presence of high speed forward or playback. Voice tags associated with the image can also be played back as a voice message to identify an image, or instruct the answering machine owner what to do with the file. The image answering machine 18 should be capable of redirecting the analog image data (in analog form) out as tones to drive another modem's input, or decoded, digitize and stored on data disk, printer or viewed on a picture phone.

If stored in digital format, the image answering machine will have to decode digital files to determine the type of file. If the file is a voice file, it will be read back into the CPU and played out as analog from the DSP section.

The invention has been described in detail with particular reference to certain preferred embodiments thereof, but it will be understood that variations and modifications can be effected within the spirit and scope of the invention.

PARTS LIST digital camera
personal computer (PC)
modem
public switched telephone network
image answering machine
telephone
interface to telephone network (RJ-11 modular jack)
data access arrangement
central processor (CPU) with digital signal processing (DSP)
DSP (Digital Signal Processor)
tape storage device—i.e., cassette tape
motor controller
digital storage device—i.e., solid state memory
printer and peripheral input and output interface
control panel and display
interface control lines
analog data signal line
control bus
universal serial bus port
serial bus port

What is claimed is:

1. Image answering apparatus comprising:

an interface for connecting to a public telephone system;
   a memory for separately storing analog syllabic rate voice signals and digital still image signals received over said public telephone system; and
   control means for selectively playing back stored analog syllabic rate voice signals and digital still image signals, said control means including means for detecting said syllabic rate audio signals so that the stored voice signals can be skipped over to access the stored digital still image signals.

2. The apparatus of claim 1 wherein said syllabic rate voice signals include a sub 20 Hertz modulation of human speech.

3. The apparatus of claim 1 including means for dialing out to the public telephone system by said interface to transmit information stored in said memory over said public telephone system.

* * * * *